July 17, 1956 H. E. HOLLMANN 2,755,419
ELECTROMECHANICAL NONLINEAR CAPACITOR
Filed June 12, 1953

INVENTOR.
HANS E. HOLLMANN
BY
ATTORNEYS

United States Patent Office 2,755,419
Patented July 17, 1956

2,755,419
ELECTROMECHANICAL NONLINEAR CAPACITOR

Hans E. Hollmann, Oxnard, Calif.

Application June 12, 1953, Serial No. 361,448

2 Claims. (Cl. 317—249)

(Granted under Title 35, U. S. Code (1952), sec. 266)

The invention described herein may be manufactured and used by or for the Government of the United States of America for governmental purposes without the payment of any royalties thereon or therefor.

The present invention relates to electromechanical types of nonlinear capacitors and more particularly to such nonlinear capacitors utilizing an arrangement whereby certain components of the device form a plurality of minute capacitors.

Capacitors according to the present invention are electrically nonlinear, i. e., their capacity varies in accordance with differences in potential between the electrodes thereof. Such capacitors and the utilization thereof are well-known as shown for instance in U. S. Patents No. 2,092,762 and No. 2,372,231. Prior art devices utilize arrangements wherein a flexible diaphragm serves as one electrode which is spaced from the counterelectrodes of the respective devices by a small air gap thereby obtaining a relatively large capacity. Even when the diaphragms of known devices are stretched close to the breaking point, the frequency response thereof is unsatisfactory at frequencies in excess of approximately fifteen kilocycles because of the resonance frequency of the diaphragms. This disadvantage cannot be eliminated by mounting known capacitors in an evacuated container since the elimination of the air cushion between the electrodes of such devices reduces the damping of movements of the thin diaphragm. The air gap of prior art devices cannot be reduced beyond a certain point due to mechanical limitations, and therefore the diameter of the thin diaphragms utilized therein cannot be reduced beyond a certain limit since the associated reduction of the capacity of the device cannot be compensated for by a proportional reduction of the air gap. The diaphragms of known devices also require precision machining in the manufacture thereof to obtain satisfactory sensitivity.

The present invention utilizes an arrangement wherein the flexible diaphragm of the device is divided into a plurality of tiny areas each of which serves as one electrode of a minute capacitor. Each of these tiny areas has a very high resonant frequency and therefore, each of the minute capacitors and consequently the over-all invention device has a satisfactory frequency response up to frequencies in excess of one megacycle. Furthermore, the thin diaphragms employed in devices according to the present invention do not require precision machining in the manufacture thereof to obtain satisfactory sensitivity, and these diaphragms need not be stretched.

An object of the present invention is the provision of a new and novel electromechanical nonlinear capacitor which has a good frequency response.

Another object is to provide a mechanical nonlinear capacitor which is simple and inexpensive in construction, yet sensitive and reliable in operation.

Other objects and many of the attendant advantages of this invention will be readily appreciated as the same becomes better understood by reference to the following detailed description when considered in connection with the accompanying drawings wherein.

Figure 1:
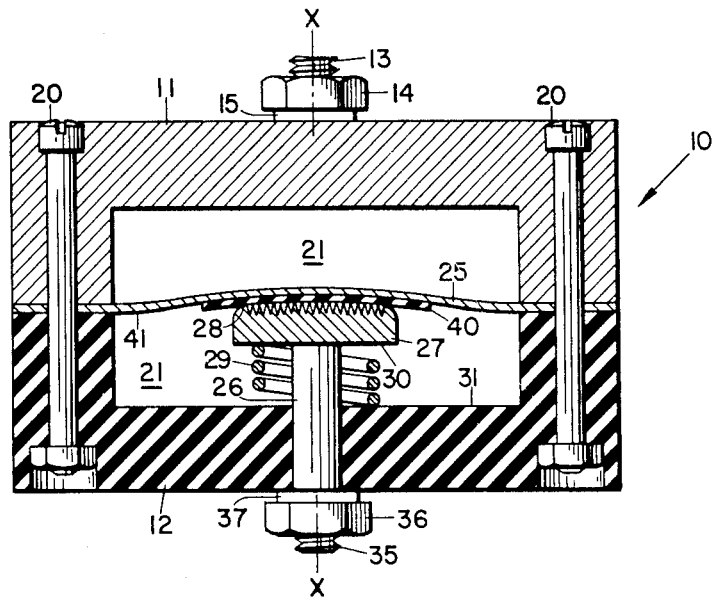
Fig. 1 is a sectional view of a preferred embodiment of the invention.

Referring now to the drawings, there is shown in Fig. 1 a body member indicated generally by numeral 10 and comprising two portions or halves 11 and 12. The outer periphery of the body member is cylindrical in shape and the device is symmetrical about the longitudinal axis $x$—$x$ thereof. Portion 11 is formed of an electrically conductive material such as copper, brass, or the like, and a threaded stud 13 of similar material is formed integral therewith. A nut 14 is adapted to be threaded on stud 13 whereby a suitable connecting electrode 15 may be clamped between the nut and portion 11. Portion 12 is formed of an electrically nonconductive material such as hard rubber, synthetic resins or the like, and portions 11 and 12 are secured in assembled position as shown by means of two diametrically opposite bolts 20 which pass through longitudinally extending openings formed in members 11 and 12 whereby an enclosed cavity 21 is formed within the body member.

A disk-shaped diaphragm 25 is symmetrically disposed about axis $x$—$x$ and is clamped between portions 11 and 12. Diaphragm 25 serves as one of the electrodes of the capacitor and is formed of a flexible or resilient electrically conductive material such as Duralumin, copper, steel and the like. The diaphram is quite thin and may be of a thickness on the order of ten microns whereby it is adapted to be deformed when subjected to electrostatic forces. The diaphragm divides cavity 21 into an upper and a lower chamber, and a vacuum is preferably created in the cavity to eliminate any tendency a gas therein would have to damp movements of the diaphragm, and in this manner, the sensitivity of the device is increased during operation thereof. A gas may be disposed within cavity 21 if desired and satisfactory results may be obtained; however, preferably, an opening should be provided in the diaphragm to allow the gas to freely circulate between the upper and lower chambers of the cavity.

A relatively rigid cylindrical member 26 is slidably mounted within a centrally located longitudinally extending opening in portion 12 and member 26 is formed of a suitable electrically conductive material such as brass, aluminum or the like. Member 26 has a substantially disk-shaped head 27 formed on one end portion thereof which serves as a second electrode of the capacitor and the head has a rounded end portion 28 on the upper surface thereof. Suitable resilient means such as a coil spring 29 is disposed between the lower surface 30 of electrode 27 and the inner surface 31 of member 12 whereby electrode 27 is normally biased in an upward direction as seen on the drawing. The opposite end portion 35 of member 26 is provided with screw threads and a nut 36 is adapted to be threaded thereon whereby a suitable connecting electrode 37 may be clamped between the nut and portion 12. It is evident that by advancing or retracting nut 36 along the threaded end portion 35, the position of electrode 27 may be selectively adjusted.

A thin, flexible disk-shaped member 40 formed of suitable dielectric material is disposed between and is in frictional engagement with the lower surface 41 of electrode 25 and the upper surface 28 of electrode 27. Member 40 may be composed of mica, rubber, synthetic resins or similar substances, and the member is quite thin, e. g. of a thickness on the order of ten microns whereby it may be easily deformed.

Surface 28 of electrode 27 is suitably roughened to provide numerous cavities in the surface as for instance by sand blasting or engraving fine grooves therein. If grooves are utilized, as shown, they may be of a depth on the order of 25 microns and preferably a group of closely spaced parallel grooves are engraved in one direction upon surface 28 and a second group of closely spaced parallel grooves are engraved at right angles to the first group of grooves. It is evident that any number and arrangement of grooves may be utilized if desired. Each of the cavities in surface 28 and the portions of members 25 and 40 lying thereover comprises a minute capacitor which has a very high resonant frequency and consequently the over-all device exhibits a high frequency response.

During operation of the device, electric voltages are applied to electrodes 25 and 27 by means of the attaching electrodes 15 and 37 respectively which may be suitably connected in an electrical circuit. When the voltages are impressed on electrodes 25 and 27, electrostatic forces are developed therebetween whereby electrode 25 is physically deformed in accordance with the signals. As member 25 is attracted toward member 27, members 25 and 40 are deformed such that the portions thereof lying over each of the cavities in the roughened surface 28 are forced into the respective cavities whereby the capacitance of each of the minute capacitors varies in accordance with the electric voltages impressed thereon. It should be noted that smaller cavities may be obtained by sand blasting than by engraving grooves in the electrode and that a good frequency response is obtainable at higher frequencies when smaller cavities are employed.

Spring 29 continually urges electrode 27 in an upward direction as seen in the drawing, and since surface 28 is rounded, flexible electrode 25 will be continuosly flexed to provide a correspondingly rounded surface at the central portion thereof to insure that the opposite surfaces of member 40 remain in continuous engagement with electrodes 25 and 27 respectively.

Diaphragm 25 and member 40 may be replaced by a flexible diaphragm formed of a material similar to that of member 40 and having a suitable coating of electrically conductive material such as copper, silver, and the like on the upper surface thereof whereby such diaphragm may be clamped between portions 11 and 12 just as member 25 is in Fig. 1. The coating on the upper surface of the diaphragm then serves as an electrode of the capacitor and the remainder of the diaphragm serves as the dielectric, the lower surface of the diaphragm engaging surface 28.

Figure 2:
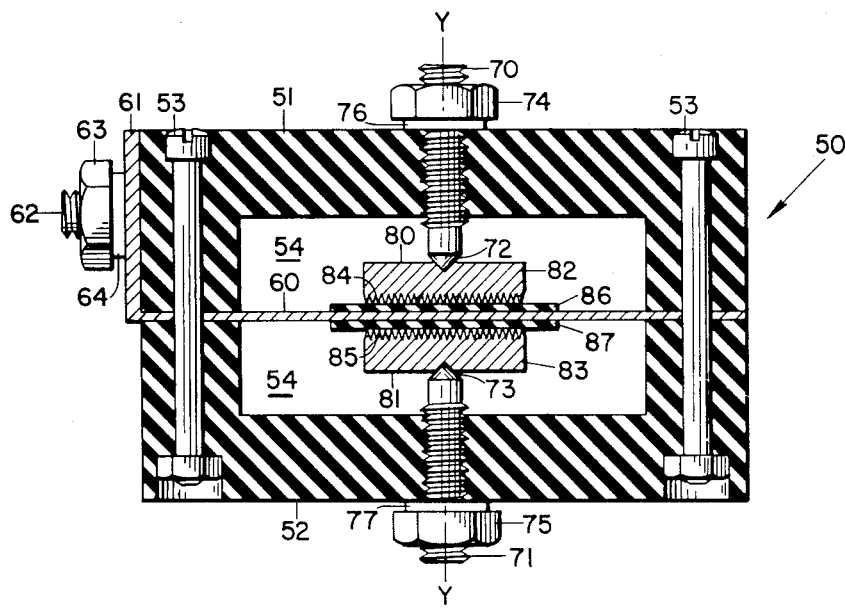
Fig. 2 is a sectional view of a modification of the invention.

Fig. 2 illustrates a modification of the invention wherein a body member indicated generally by numeral 50 comprises two portions or halves 51 and 52. The outer periphery of the body member is cylindrical in shape and the device is symmetrical about the longitudinal axis $y$—$y$ thereof. Portions 51 and 52 are formed of electrically nonconductive material such as hard rubber, synthetic resins or the like, and are secured in assembled position as shown by means of two diametrically opposite bolts 53 which pass through longitudinally extending openings formed in members 51 and 52, thereby forming an enclosed cavity 54 within the body member.

A disk-shaped diaphragm 60 is symmetrically disposed about axis $y$—$y$ and is clamped between portions 51 and 52. The diaphragm divides cavity 54 into an upper and a lower chamber and a vacuum is preferably created in the cavity, although a gas may be disposed therein and an opening may be provided in the diaphragm in a manner similar to that described in connection with the device shown in Fig. 1.

Diaphragm 60 serves as one of the electrodes of the capacitor and is similar to diaphragm 25 in the device shown in Fig. 1, the difference being that the diaphragm has a small extension 61 which is bent upwardly at a right angle from the diaphragm and is shaped so as to fit snugly about a small arc of the outer periphery of the body member. A threaded stud 62 is formed integral with extension 61 and a nut 63 is adapted to be threaded on stud 62 whereby a suitable connecting electrode 64 may be clamped between the nut and portion 61.

Screws 70 and 71 are provided with threads on the outer periphery thereof and are threaded into correspondingly threaded openings located centrally within and extending longitudinally through portions 51 and 52 respectively. A nut 74 is adapted to be threaded on screw 70 whereby a suitable connecting electrode 76 may be clamped between the nut and portion 51, and a nut 75 is adapted to be threaded on screw 71 whereby a suitable connecting electrode 77 is adapted to be clamped between the nut and portion 52.

Screws 70 and 71 are provided with tapered end portions 72 and 73 respectively which are adapted to seat in correspondingly shaped recesses in surfaces 80 and 81 of disk-shaped electrodes 82 and 83 respectively. Electrodes 82 and 83 are formed of a suitable electrically conductive material such as copper, brass or the like and the surfaces 84 and 85 thereof are roughened in a manner similar to that of surface 28 of the device shown in Fig. 1. It is evident that the positions of electrodes 82 and 83 may be selectively adjusted by means of screws 70 and 71 respectively.

Thin disk-shaped members 86 and 87 similar to member 40 shown in Fig. 1 are disposed between and are in frictional engagement with surface 84 and the upper surface of diaphragm 60, and surface 85 and the lower surface of diaphragm 60 respectively.

A plurality of minute capacitors are formed between members 60 and 82 and between members 60 and 83 in a manner similar to that described in connection with Fig. 1 and the device will accordingly have a high frequency response. During operation of the device, electric voltages are applied to electrodes 60, 82, 83 by means of the attaching electrodes 64, 76, 77 respectively which may be suitably connected in an electrical circuit. When the voltages are impressed on electrodes 60, 82, 83 electrostatic forces are developed between the electrodes, and electrode 60 is physically deformed as previously described whereby the capacitance of each of the minute capacitors of the device varies in accordance with the voltages impressed thereon.

The thickness of the flexible electrode and dielectric members and the depth of the cavities in the roughened surfaces in the relatively rigid electrodes of the device shown in Fig. 2 are the same as the corresponding members shown in Fig. 1, and members 86 and 87 may be replaced by a coating of similar material which may be applied to the opposite surfaces of diaphragm 60.

It should be understood that the body member of the invention device need not be cylindrical in its configuration and the thin flexible diaphragm utilized therein need not necessarily be disk-shaped in configuration although the configurations shown are preferable. Furthermore, any suitable means may be provided for clamping the flexible diaphragm within the body member so long as the diaphragm is securely supported therein, and although the cavities within the body members have been shown as being preferably completely enclosed, openings may be provided in the body member to provide communication between the interior and exterior thereof.

From the foregoing, it is apparent that there is provided a new and novel electromechanical nonlinear capacitor which has a good frequency response at high frequencies and which is simple and inexpensive in construction, yet sensitive and reliable in operation.

Obviously many modifications and variations of the present invention are possible in the light of the above teachings. It is therefore to be understood that within the scope of the appended claims the invention may be practiced otherwise than as specifically described.

I claim:

1. An electromechanical nonlinear capacitor which comprises a body member including two portions formed of an electrically nonconductive substance, means for securing said portions in assembled position such that an enclosed cavity is formed within said body member, said cavity being substantially evacuated of gas, a first electrode comprising a thin flexible diaphragm the outer edges of which are clamped between said two portions thereby separating said cavity into two chambers, a second relatively rigid electrode having a roughened surface and being disposed within one of said chambers, a first thin flexible member composed of solid dielectric material disposed between and being in engagement with said first and second electrodes, a third relatively rigid electrode having a roughened surface and being disposed within another of said chambers, a second thin flexible member composed of solid dielectric material disposed between and being in engagement with said first and third electrodes, and means for selectively adjusting the positions of said second and third electrodes.

2. An electromechanical nonlinear capacitor which comprises a body member including two portions formed of an electrically nonconductive substance, means for securing said portions in assembled position such that an enclosed cavity is formed within said body member, a first electrode comprising a thin flexible diaphragm the outer edges of which are clamped between said two portions thereby separating said cavity into two chambers, the opposite surfaces of said diaphragm being coated with an electrically nonconductive substance, a second relatively rigid electrode disposed within one of said chambers and having a roughened surface adapted to engage the coating on one surface of said first electrode, a third relatively rigid electrode disposed within the other of said chambers and having a roughened surface adapted to engage the coating on the opposite surface of said first electrode, and means for selectively adjusting the positions of said second and third electrodes.

References Cited in the file of this patent
UNITED STATES PATENTS

| | | |
|---|---|---|
| 1,813,855 | Klar | July 7, 1931 |
| 1,859,170 | Reisz | May 17, 1932 |
| 2,092,762 | Kroger | Sept. 14, 1937 |
| 2,175,354 | Lewin | Oct. 10, 1939 |
| 2,372,231 | Terman | Mar. 27, 1945 |
| 2,436,946 | Tatro | Mar. 2, 1948 |
| 2,509,310 | Moreland | May 30, 1950 |